US007743154B2

(12) United States Patent
Talanis et al.

(10) Patent No.: US 7,743,154 B2
(45) Date of Patent: Jun. 22, 2010

(54) SYSTEM AND METHOD FOR THE OPERATOR CONTROL AND FOR THE MONITORING OF AN AUTOMATION SYSTEM OVER THE INTERNET USING AN ASYMMETRIC INTERNET CONNECTION

(75) Inventors: Thomas Talanis, Heroldsbach (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 415 days.

(21) Appl. No.: 11/595,366

(22) Filed: Nov. 9, 2006

(65) Prior Publication Data
US 2007/0094388 A1    Apr. 26, 2007

Related U.S. Application Data

(63) Continuation-in-part of application No. 09/916,415, filed on Jul. 27, 2001, now abandoned, which is a continuation of application No. PCT/DE00/00146, filed on Jan. 17, 2000.

(30) Foreign Application Priority Data
Jan. 28, 1999    (DE)    ................................. 199 04 331

(51) Int. Cl.
*G06F 15/16*    (2006.01)
(52) U.S. Cl. ....................................... 709/227; 709/229
(58) Field of Classification Search ................. 709/221, 709/224, 225, 227, 229, 232
See application file for complete search history.

(56) References Cited

U.S. PATENT DOCUMENTS 6,041,356 A    3/2000    Mohammed
(Continued)

FOREIGN PATENT DOCUMENTS

DE    198 08 616 A1    9/1998
(Continued)

OTHER PUBLICATIONS

Horstmann, Markus and Mary Kirtland. DCOM Architecture. Microsoft Developer's Network Library. Jul. 23, 1997.*
(Continued)

*Primary Examiner*—Ramy M Osman
*Assistant Examiner*—Marshall McLeod

(57)    ABSTRACT

The invention relates to a device and a method for transmitting data over the Internet, in particular data for operating and monitoring an automation system using a bidirectional user data connection, even behind fire walls and even from a client which is not visible as a server on the Internet. The method and device transmit a first connection request for setting up a first transmission channel from a first data processing device of a client, in particular from an operator control and monitoring system to an Internet server of an automation system via an Internet connection. In addition, a second connection request for setting up a second transmission channel is transmitted to the Internet server from the client, the first and second transmission channels being provided for bidirectionally transmitting and receiving, independently of one another in terms of timing, data between the client and the Internet server over the Internet. A chronologically unlimited period of use of the transmission channels is assured by virtue of the fact that in order to maintain the transmission channels, dummy data are transmitted even in the absence of user data.

2 Claims, 3 Drawing Sheets

U.S. PATENT DOCUMENTS

| | | | |
|---|---|---|---|
| 6,282,575 | B1 | 8/2001 | Lin et al. |
| 6,317,797 | B2 | 11/2001 | Clark et al. |
| 6,421,728 | B1 * | 7/2002 | Mohammed et al. ......... 709/227 |
| 6,553,422 | B1 | 4/2003 | Nelson |
| 6,564,128 | B2 * | 5/2003 | Baird et al. ................... 701/33 |
| 6,665,711 | B1 | 12/2003 | Boyle et al. |
| 6,931,447 | B1 | 8/2005 | Hemstreet et al. |
| 7,418,511 | B2 * | 8/2008 | Takechi et al. .............. 709/229 |
| 2002/0143446 | A1 | 10/2002 | Rogers et al. |
| 2002/0147927 | A1 * | 10/2002 | Tait ............................ 713/201 |

FOREIGN PATENT DOCUMENTS

EP  1 147 642 B1  10/2001

OTHER PUBLICATIONS

John E.F. Baruch and Mark J. Cox, "Remote control and robots: an Internet solution", Computing & Control Engineering Journal, GB Stevenage, vol. 7, No. 1, Feb. 1, 1996, pp. 39-45, XP000614098.

Microsoft Corporation, DCOM Technical Overview, Michrosoft Developer's Network Library, Nov. 1996, http://msdn.microsoft.com/library/en-us/dndcom/html/msdn_dcomtech.asp?frame=true.

Markus Horstmann and Mary Kirtland, DCOM Architecture, Microsoft Developer's Network Library, Jul. 23, 1997, http://msdn.microsoft.com/library/en-us/dndcom/html/msdn_dcomarch.asp?frame=true.

Mark Levy, COM Internet Services, Michrosoft Developer's Network Library, Apr. 23, 1999, http://msdn.microsoft.com/library/en-us/dndcom/html/cis.asp?frame=true.

* cited by examiner

SYSTEM AND METHOD FOR THE OPERATOR CONTROL AND FOR THE MONITORING OF AN AUTOMATION SYSTEM OVER THE INTERNET USING AN ASYMMETRIC INTERNET CONNECTION

CROSS REFERENCE TO RELATED APPLICATIONS

This application is a Continuation-In-Part of U.S. application Ser. No. 09/916,415, filed Jul. 27, 2001 now abandoned which is incorporated by reference herein in its entirety. U.S. application Ser. No. 09/916,415 is a Continuation of the International Application No. PCT/DE00/00146, filed Jan. 17, 2000 which claims priority to the German Application No. 19904331.0, filed Jan. 28, 1999. The International Application No. PCT/DE00/00146 and the German Application No. 19904331.0 are also incorporated herein in their entirety.

FIELD OF THE INVENTION

The invention relates to a system and a method for transmitting data over the Internet, in particular data for operating and monitoring an automation system.

BACKGROUND OF INVENTION

The use of the WWW (World Wide Web), which is also referred to as the Internet, makes it possible to set up a data connection to a web server or Internet Information Server (IIS) from any computer which has access to the Internet. The access to an Internet Server is made, for example, using known Internet browsers, for example Internet Explorer from Microsoft or the Internet browser from Netscape. When a data connection is set up from a web client, a request is output to an Internet Server by inputting and dispatching a URL address. When a data connection comes about, the called Internet server responds with a HTML (Hyper Text Markup Language) page. The WWW clients, for example Netscape or Internet Explorer, communicate with the WWW servers via the Hypertext Transport Protocol (HTTP). Each data connection between the WWW client and WWW server is thus based on a request protocol, and a response protocol in reaction thereto.

DE-A-198 08 616 discloses a method for the remote control of equipment by means of a computer which is located geographically remotely therefrom, and for transmitting current information from the equipment to the computer over the Internet, a bidirectional information channel for mutual exchange of data being connected between the computer and the equipment.

SUMMARY OF THE INVENTION

The present invention is based on the object of specifying a system and a method for transmitting data over the Internet which also permits bidirectional transmission of data, independently in terms of timing, between two data processing devices which can be connected to the Internet, even behind fire walls and even if one of the two data processing devices is not visible on the Internet, i.e. is not an Internet Server.

"Not visible on the Internet" in this context means that the respective data processing device has a private IP address valid (and thus visible) only in a local network. Such processing device can be connected to the Internet via an NAT-router (Network Address Translation router) which in turn has an official IP address, e.g. registered with an Internet provider such as AOL, t-online etc. The NAT-router is therefore visible (and addressable) on the internet. The private IP address of the non-visible data processing device may be e.g. 192.xxx.x.x or 168.xxx.x.x (IP addresses chosen from reserved private address bands), whereas the official IP address of the NAT router may be e.g. 222.x.x.x. When connecting to the Internet, the NAT-router acts as a representative for the connected non-visible data processing devices and attaches its official IP address to all data packages leaving the local network. Therefore, the non-visible data processing devices cannot be directly addressed from outside the local network as the devices communicate using the official IP address of the NAT-router.

The invention is based on the recognition that with the Internet an "active" data connection to a client which is not visible on the Internet is not possible, but rather only a data connection between any desired client which is connected to the Internet and any desired server which is visible on the Internet. This disadvantage is overcome in a surprisingly simple way by virtue of the fact that two mutually independent data connections are set up to the Internet Server of an automation system from the client via an NAT-router. A corresponding method for transmitting data between an Internet server and a client over the Internet may include the following steps:

transmitting from a client a first connection request for setting up a first transmission channel via an Internet connection to an Internet server using an NAT-router connected to the client;

transmitting to the client a first response to the first connection request by the Internet server, the first response establishing the first transmission channel and including connection data for subsequently establishing a second transmission channel via an Internet connection to the Internet server;

transmitting information to the Internet server by the client for maintaining the first transmission channel, the information informing the Internet server that there is an intention to further transmit user data to the Internet server for avoiding cancellation of the first transmission channel by the Internet server;

transmitting from the client a second connection request for setting up a second transmission channel via an Internet connection to the Internet server using the connection data, wherein the first and second connection requests are successively transmitted; and transmitting to the client a second response to the second connection request by the Internet server, the second response establishing the second transmission channel, wherein the client has a private IP address valid only in a local network and is thus not visible on the internet, the client is connected to the NAT-router having an IP address visible on the internet for establishing a connection to the Internet via the NAT-router, the first transmission channel and the second transmission channel bidirectionally transmit and receive, independently of one another in terms of timing, data between the client and the Internet server over the Internet, the first transmission channel is a back channel for transmitting user data from the Internet server to the client, and the second transmission channel is a forward channel for transmitting requests from the client to the Internet server.

The connection data referenced before may include official IP address of the router, the local IP address of the client, the official IP address of the Internet Server and any other relevant or helpful information.

Specifically, two connection requests are successively transmitted to the Internet Server of the automation system from the client which can serve as a fully capable operator control and monitoring system after the bidirectional data connections have been set up. The Internet Server responds to these connection requests and thus makes available two asymmetrical data connections which are independent of one another and via which the client, as B&B system (Operating and Monitoring system) and the automation system can communicate with one another at their own initiation. A bidirectional data connection, which also permits data to be transmitted from the server to the client, is functionally safeguarded between the client and server, or in other words between the operator control and monitoring system and the automation system. This is based on the establishment of the two independent data connections to the server via the Internet which are set up from the client. By way of these two "dedicated lines", the client is permanently connected to the server so that bidirectional transmission of data, independently in terms of timing, is made possible in both directions between the client and server. Such a data connection is suitable in particular for operating and monitoring an automation system, with the client being able to function as an operator control and monitoring system which can be activated from any computer which is connected to the Internet. In contrast to conventional Internet data connections, an asymmetrical data transmission method is thus obtained which does not require the client to be visible on the Internet or to have installed a web server (IIS=Internet Information Server). This makes it possible to set up a bidirectional data connection to a server at any desired location in the world, in front of and behind fire walls. Because the data connection is activated from the client, i.e. from the B&B system, it is not necessary for the server to actively set up a connection to the client at its own initiation. Furthermore, it is not necessary to change the configuration of the client.

It is possible to ensure that the data connection or connections is/are maintained by transmitting dummy data, even in the absence of user data, in order to maintain the transmission channels. In addition, in order to maintain a permanent data connection, information is transmitted to the Internet Server, said information informing the Internet Server that there is still an intention to transmit user data.

A particularly preferred application of the present invention using existing Internet infrastructures for a bidirectional data transmission, is to provide the method for operating and monitoring an automation system is provided over the Internet. A connection of the automation and communications technology can be configured easily in such a way that the operator control and monitoring system of the client initiates the provision of the transmission channels as a distributed object, in particular as a DCOM object, and that the connection setup to the automation system is made via a DCOM server.

DRAWINGS

The present invention is further described and explained in more detail below with reference to the exemplary embodiments illustrated in the figures, in which.

DETAILED DESCRIPTION OF THE INVENTION

Figure 1:
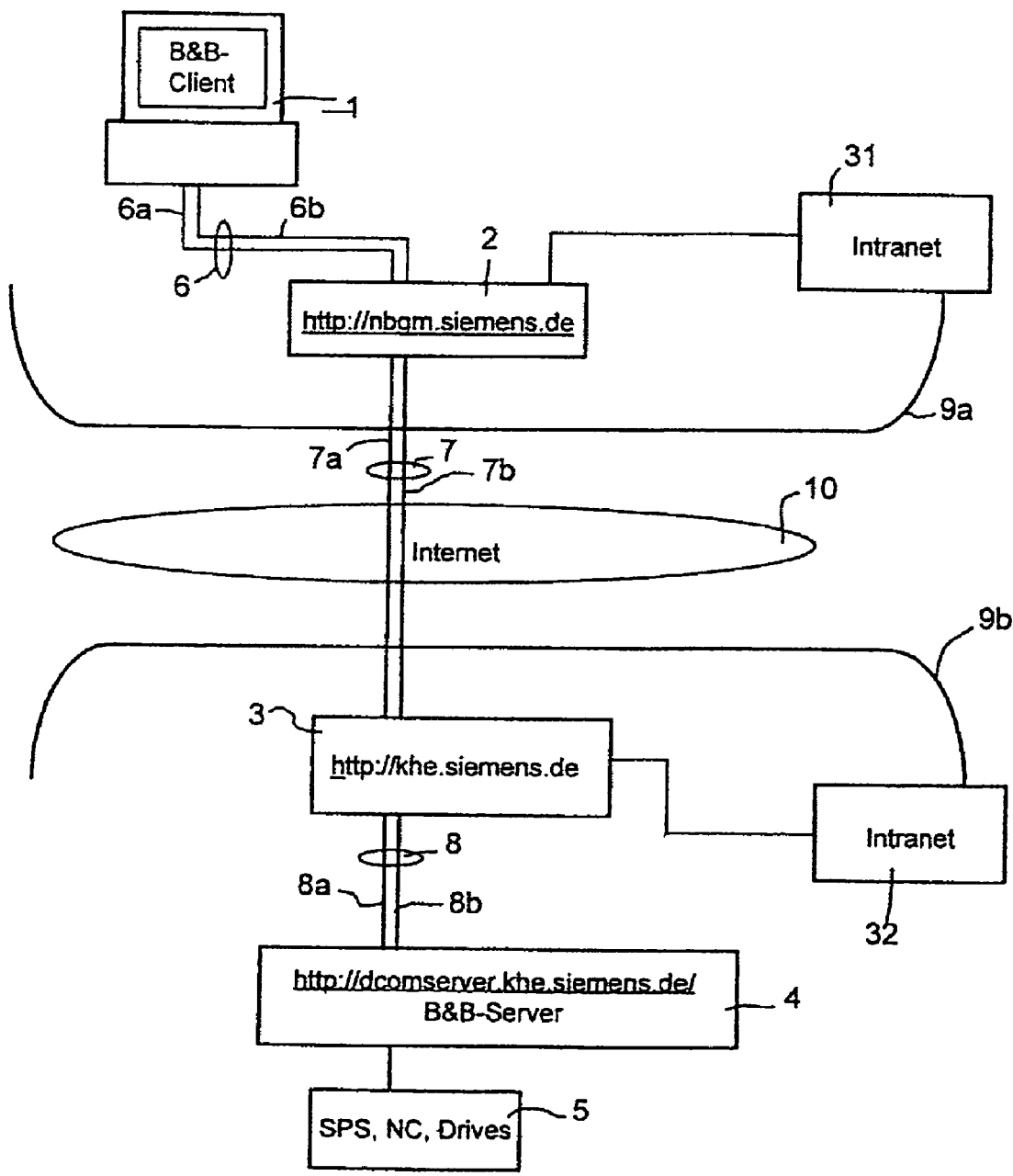
FIG. 1 shows a block circuit diagram of an exemplary embodiment of an automation system with Internet connection for operating and monitoring.

FIG. 1 shows an exemplary embodiment of a system for operating and monitoring automation systems 5 which have, for example, stored program controllers (SPS), numerical controllers (NC) and/or drives. The system has an operator control and monitoring system 1 (B&B client) which is connected to a fire wall computer 2 (=proxy) embodied as an NAT-router via an internal, local data network 6, for example a local Ethernet. The operator control and monitoring system 1, which is also referred to below for short as B&B system 1, is assigned a local Intranet address (=IP address only valid in a local network) which is not known on the Internet. Therefore, the B&B system 1 is not visible on the internet. The fire wall of the fire wall computer 2 which surrounds the internal communications network 31 (=Intranet 31) of the fire wall server 3 is indicated using the line 9a in FIG. 1. The Internet, the worldwide data communications network, is labeled with the reference symbol 10. The fire wall computer 2 can be connected via a connecting line 7, for example ISDN, to the Internet 10. The automation system 5 can be connected to the Internet 10 via an Internet server 4, which serves as a B&B server for the automation system 5 and which has the Internet address dcomserver.khe.siemens.de/, via a connecting line 8 and in each case a second fire wall computer 3. The second fire wall computer 3 surrounds the Intranet 32 assigned to the fire wall computer 3 and is visible on the Internet 10 at the Internet address khe.siemens.de.

The setup of a bidirectional transmission and reception connection between the client 1 and the B&B server 4 over the Internet 10, the connections being independent of one another in terms of timing, will be explained below by way of the following example. An asymmetric method is used which makes it possible to set up a bidirectional data connection even from the client 1 which is not visible on the Internet 10, i.e. client 1 has only a locally valid IP address. Client 1 sends a first request over the Internet to the Internet Server 4 to which the Internet server 4 reacts with a response. In order to avoid a chronological interruption of the response, and thus aborting of the data connection, the duration of the response is expanded so as to be "infinitely" long. For this purpose, the system is informed that further data are to be transmitted. This results in a response channel over which the web server 4, and thus the automation system 5, can transmit data to the client 1, and thus to the B&B system 1, at any time. This first data transmission channel is labeled in FIG. 1 by the reference symbol 6a, 7a, 8a. A second data transmission channel is set up by the client 1 by sending a second request to the Internet Server 4 of the automation system 5, and thus setting up a data transmission channel 6b, 7b, 8b to the server 4. The client can dispatch his request or requests to the server 4 on said channel as a forward channel. Overall, from the point of view of the client 1 a forward channel 6a, 7a, 8a, and a back channel 6b, 7b, 8b are thus formed. Over these two channels, the client 1 and the Internet Server 4 can bidirectionally transmit and receive, independently of one another in terms of timing, data.

Figure 2:
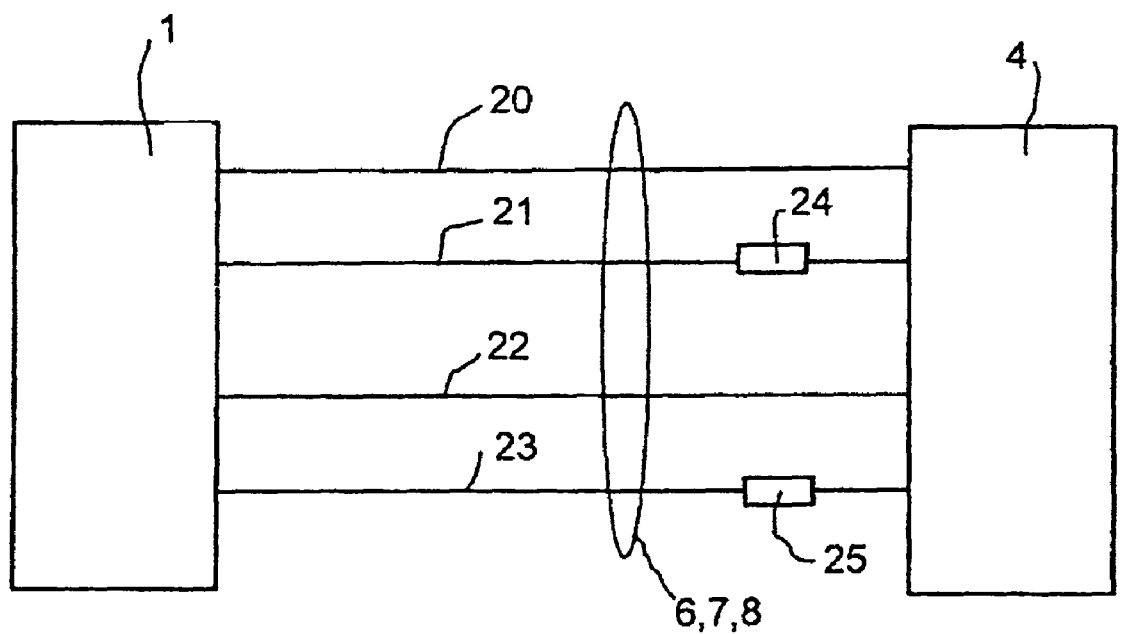
FIG. 2 shows a schematic, chronological representation of the bidirectional connection set up between client and automation system.

FIG. 2 shows a schematic, chronological representation of the bidirectional connection setup between a client 1 (B&B system) and an Internet Server 4 (IIS=Internet Information Server) of an automation system 5 (see FIG. 1). In a first step, a first "get" request 20 (=connection request, back channel) initiated from the client 1 is made to the server 4. The server (4) replies in step 21 in the form of a response, to be interpreted here as an acknowledgement. In the next step, a "post" request 22 (=connection request, forward channel) is sent from the client 1 to the server 4, which responds to this with a reply 23 as a response. The "get" channel is established before the post channel so that here even in the actual acknowledgement the server can transmit connection data to the client which are required for the setup of the second ("post") connection.

The principal bidirectional connection setup between client 1 and server 4 thus takes place in a two-stage request 20, 22 with respectively associated response 21, 23. In each case it is ensured that the data connections are maintained by virtue of the fact that dummy data 24 are transmitted even during the absence of user data in order to maintain the transmission channels, and that information is transmitted to the B&B server 4, said information informing the B&B server 4 that there is still an intention to transmit user data.

Figure 3:
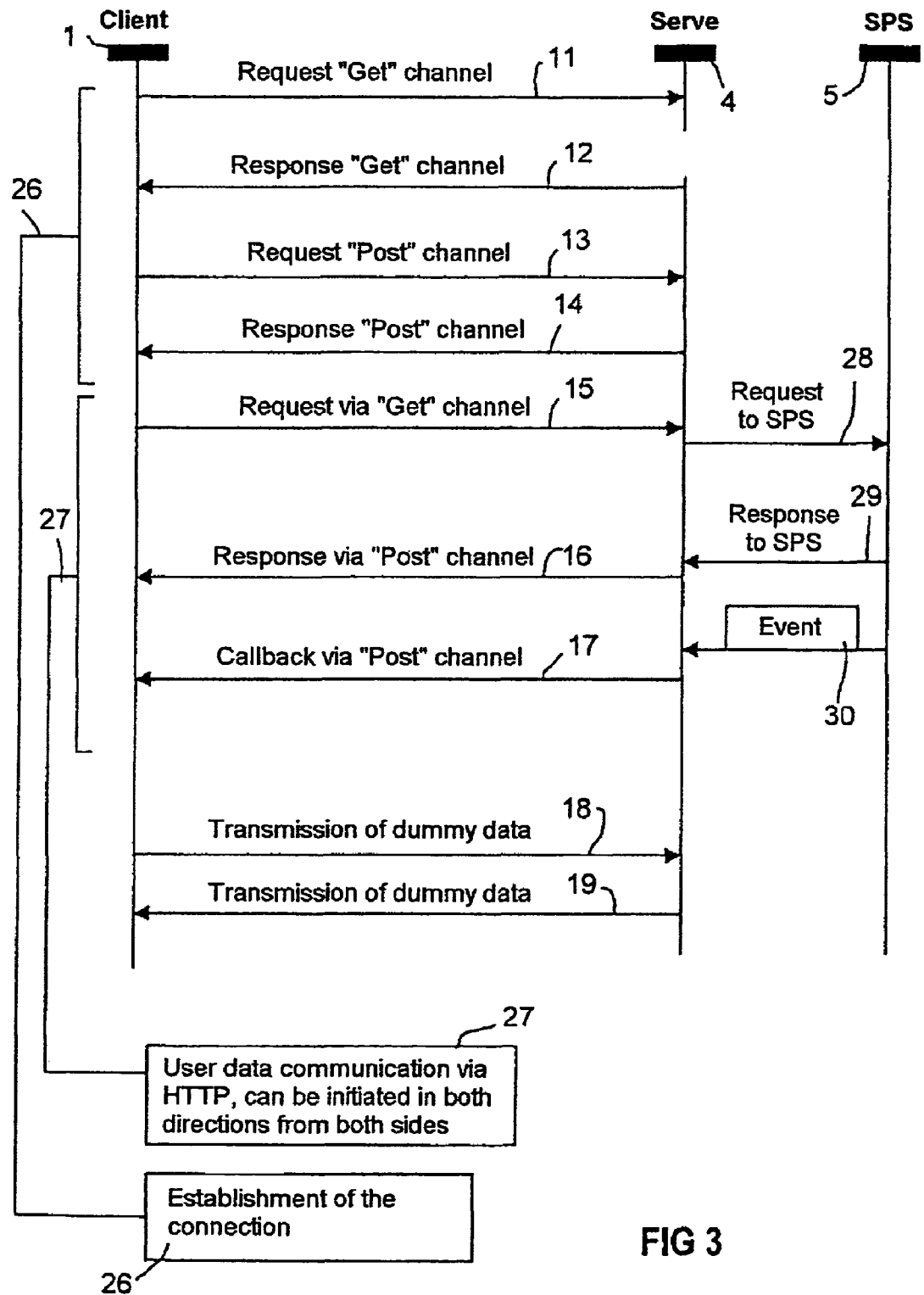
FIG. 3 shows a schematic chronological representation of possible user data communication between client and automation system.

FIG. 3 shows the timing sequence of the establishment 26 of a forward channel and back channel between a B&B system 1 and a B&B server 4 to which an automation system 5, designated by way of example as SPS (=stored program controller) is connected. The presentation is made here using the UML (Unified Modeling Language) notation. Furthermore, FIG. 3 shows the bidirectional communication over these channels which can be initiated independently of one another in terms of timing by client 1 and server 4 after the establishment of the connection. The timing sequence for establishing the connection is as follows: the client 1 makes a HTTP get request 11 to the server 4, which acknowledges this with a response 12, the connection not being released with the acknowledgement. Via this connection ("get channel"), the server 4 and the automation system 5 which is connected to the server transmits all the data to be transmitted to the client 1. After the response 12 of the server 4, the client transmits a HTTP post enquiry 13 to the server 4 which in turn replies with a response 14. Via this connection ("post channel"), the client 1 transmits all the data which he wishes to transmit, for example as an enquiry 28, to the server 4 and to the automation system 5 which is connected thereto. Although the request response cycle is terminated on the post channel, the connection remains. When necessary, the client 1 sends an enquiry to the server 4 via the get channel 15, in response to which the server reacts with a reply on the post channel 16 (=synchronous behavior). If the server 4 wishes to send the client 1 a message, for example a reply 29 or a reaction to an event 30 in the SPS 5, it can transmit this on the post channel without the client having previously made a request (=callback 17). This would not be possible with a "normal" HTTP connection.

There is thus a user data communication 27 over the Internet in both directions independently in terms of timing, which user data communication 27 can be initiated by both sides. In this way, it becomes possible to use an existing communication path of the Internet for automation technology in a customary way for operator control and monitoring purposes as a HMI (Human Machine Interface). One possible advantageous application of this method is, for example, the operator control and monitoring system WinCC from Siemens. The system and method according to the invention permit DCOM orders to be transmitted from the client 1 to the Internet Server 4. This makes it possible for the Internet Server 4 to transmit DCOM events to its client without said client having a "real" address, i.e. one which is visible on the Internet. No additional costs are thus required on the client side because Internet browsers, like Internet Explorer from Microsoft or the Internet browser from Netscape, are available everywhere. No particular special solutions are therefore necessary to exchange data between the automation system and the B&B user, for example for alarm issuing purposes.

In summary, the method of the present invention provides a system and a method for transmitting data over the Internet, in particular data for operating and monitoring an automation system 5 using a bidirectional user data connection, even behind fire walls over the Internet in both directions and even from a client which is not visible as a server in the Internet. In accordance with the method and a system, a first connection request 20 for setting up a first transmission channel is transmitted from a first data processing device 1 of a client, in particular from an operator control and monitoring system 1, to an Internet server 4 of an automation system 5 via an Internet connection 6, 7, 8. A second connection request 22 for setting up a second transmission channel 31 is transmitted to the Internet Server 4 from the client 1, the first transmission channel 30 and the second transmission channel 31 being provided for bidirectionally transmitting and receiving, independently of one another in terms of timing, data between the client and the Internet Server 4 over the Internet. An unlimited period of use of the transmission channels is ensured by virtue of the fact that dummy data are transmitted even in the absence of user data in order to maintain the transmission channels.

We claim:

1. A method for transmitting data bidirectionally and asymmetrically across a single connecting line over the Internet between an Internet server and a client connected to the Internet behind a firewall computer proxy via an internal data network, comprising:

transmitting from a client connected to the Internet behind a firewall computer proxy via an internal data network a first connection request for setting up a first transmission channel on a connecting line via an Internet connection to an Internet server, wherein the client has a local Intranet address and is not directly addressable on the Internet by the Internet server;

transmitting to the client a first response to the first connection request by the Internet server, the first response establishing the first transmission channel as a back channel on the connecting line and including connection data for subsequently establishing a second transmission channel on the connecting line via an Internet connection to the Internet server, wherein the first transmission channel is not released with the first response;

transmitting from the client a second connection request for setting up a second transmission channel on the connecting line via an Internet connection to the Internet server using the connection data, wherein the first and second connection requests are successively transmitted; and transmitting to the client a second response to the second connection request by the Internet server, the second response establishing the second transmission channel on the connecting line as a forward channel;

maintaining the first and second channels on the connecting line by transmitting dummy data between the client and the Internet server during an absence of user data to ensure an unlimited period of use; wherein the first transmission channel and the second transmission channel bidirectionally transmit and receive on the connecting line, independently of one another in terms of timing, data between the client and the Internet server over the Internet, wherein the back channel on the connecting line is for transmitting responses from the Internet server to the client in reply to client requests on the forward channel and for transmitting messages to the client without the client having previously made a request on the forward channel, and the forward channel on the connecting line is for transmitting requests from the client to the Internet server; wherein data for operating and monitoring an automation system is provided over the Internet, the first transmission channel used for transmitting status data of the automation system to the client, and the second transmission channel used for transmitting requests from the client to the automation system; wherein the client is an operator control and monitoring system which initiates the transmission channels as a DCOM object, and the setup of the connection to the automation system is made via a DCOM server.

2. A system for transmitting data bidirectionally and asymmetrically across a single connecting line over the Internet between an Internet server and a client connected to the Internet behind a firewall computer proxy via an internal data network, the system comprising:

an Internet server; a client connected to the Internet behind a firewall computer proxy via an internal data network having an IP address valid only in a local network and thus not being visible on the Internet; and, wherein the client is configured to transmit a first connection request on a connecting line for setting up a first transmission channel on the connecting line via an Internet connection to the Internet Server, the Internet server is configured to transmit to the client a first response to the first connection request, the first response establishing the first transmission channel on the connecting line as a back channel and including connection data for subsequently establishing a second transmission channel on the connecting line via an Internet connection to the Internet Server, wherein the first transmission channel is not released with the first response;

the client is further configured to transmit a second connection request for setting up a second transmission channel on the connecting line via an Internet connection to the Internet Server using the connection data, wherein the first and second connection requests are successively transmitted, the Internet Server is further configured to transmit to the client a second response to the second connection request, the second response establishing the second transmission channel on the connecting line as a forward channel;

the client and the Internet Server configured to maintain the first and second channels on the connecting line by transmitting dummy data therebetween during an absence of user data to ensure an unlimited period of use;

the first transmission channel and the second transmission channel on the connecting line are configured to bidirectionally transmit and receive on the connecting line, independently of one another in terms of timing, data between the client and the Internet Server over the Internet, wherein the back channel on the connecting line is for transmitting responses from the Internet Server to the client in reply to client requests on the forward channel and for transmitting messages to the client without the client having previously made a request on the forward channel, and the forward channel on the connecting line is for transmitting requests from the client to the Internet Server; wherein data for operating and monitoring an automation system is provided over the Internet, the first transmission channel used for transmitting status data of the automation system to the client, and the second transmission channel used for transmitting requests from the client to the automation system; wherein the client is an operator control and monitoring system which initiates the transmission channels as a DCOM object, and the setup of the connection to the automation system is made via a DCOM server.

* * * * *